United States Patent [19]

Kennicutt

[11] 3,724,289
[45] Apr. 3, 1973

[54] LIMITED SLIP DIFFERENTIAL WITH CLUTCH CONTROL MEANS

[75] Inventor: Robert B. Kennicutt, Morton, Ill.

[73] Assignee: Caterpillar Tractor Co., Peoria, Ill.

[22] Filed: Mar. 29, 1971

[21] Appl. No.: 128,950

[52] U.S. Cl. ................................................ 74/711
[51] Int. Cl. .......................................... F16h 1/44
[58] Field of Search ........................................ 74/711

[56] References Cited

UNITED STATES PATENTS

| | | | |
|---|---|---|---|
| 3,350,961 | 11/1967 | Dodge | 74/711 |
| 3,229,550 | 1/1966 | Nickell | 74/711 |
| 2,627,190 | 2/1953 | Bottcher | 74/711 |
| 2,655,055 | 10/1953 | Bottcher | 74/711 |
| 2,978,929 | 4/1961 | Roberts | 74/711 |
| 3,230,795 | 1/1966 | Mueller | 74/711 |
| 3,232,139 | 2/1966 | Nickell | 74/711 |
| 3,393,583 | 7/1968 | Mueller | 74/711 |

Primary Examiner—C. J. Husar
Attorney—Fryer, Tjensvold, Feix, Phillips & Lempio

[57] ABSTRACT

A limited slip differential comprises juxtaposed axle gears meshing with intermediate spider gears rotatably mounted on a carrier. A hydraulically actuated friction clutch is positioned between each spider gear and the carrier to retard rotation of the spider gears in response to a rotational speed differential of the axle gears. Control means for automatically actuating the clutches comprises a multi-lobed cam attached to an axle gear and a plurality of pistons reciprocally mounted in the carrier for pressurizing actuating chambers of the clutches.

11 Claims, 3 Drawing Figures

INVENTOR
ROBERT B. KENNICUTT

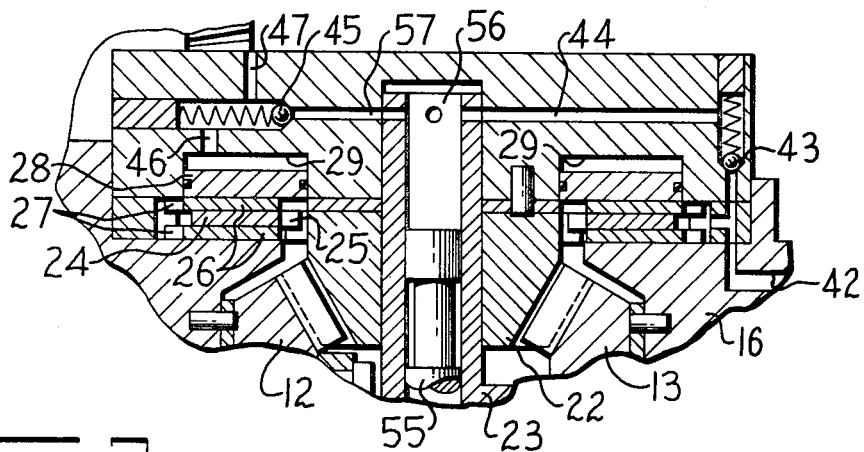
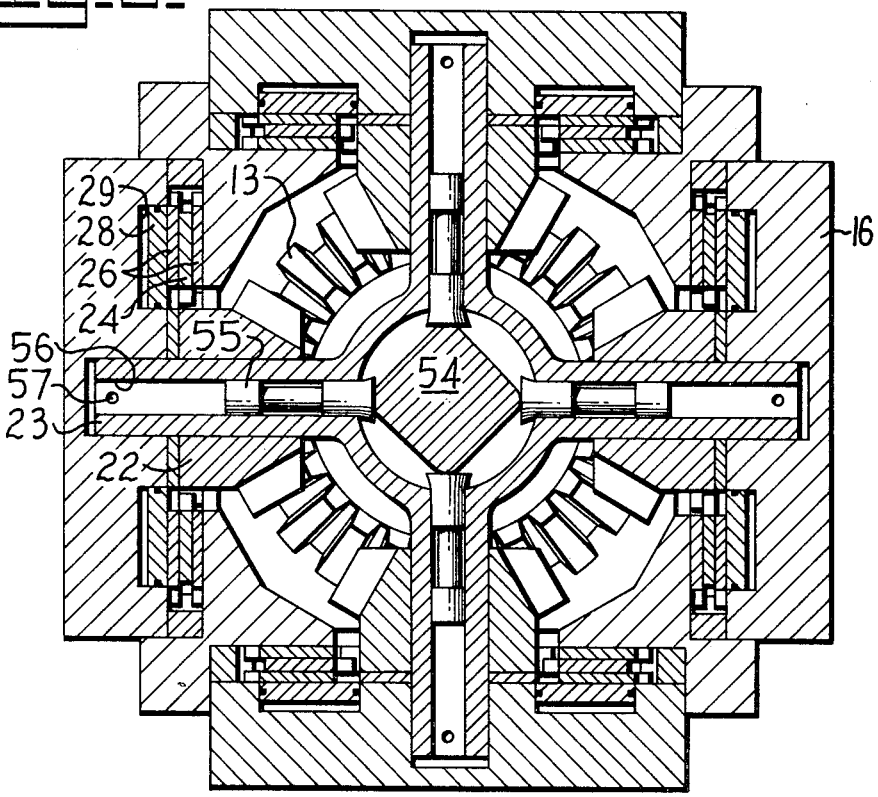

LIMITED SLIP DIFFERENTIAL WITH CLUTCH CONTROL MEANS

BACKGROUND OF THE INVENTION

Conventional differentials normally depend on frictional drag inherently created therein or on attendant devices, such as preloaded clutch packs associated with the axle gears or positive lock-up devices, to transfer drive torque to a non-slipping wheel during vehicle operation. The torque transfer capacity of such differentials is normally limited and oftentimes proves insufficient to adequately propel the vehicle when its wheels encounter unbalanced traction conditions. In addition, such differentials are oftentimes prone to failure in that they no not afford the structural integrity required for heavy duty operations, such as those encountered by large earthmoving vehicles.

SUMMARY AND OBJECTS OF THIS INVENTION

An object of this invention is to overcome the above, briefly described problems by providing a compact limited slip differential which exhibits a high degree of structural integrity and ability to efficiently transfer high magnitudes of torque to a non-slipping wheel during vehicle operation. The differential comprises a pair of juxtaposed axle gears, each mounted on a drive axle, and a carrier mounted for rotation relative to the drive axles. At least one pinion or spider gear is rotatably mounted on the carrier to mesh with the axle gears for differentially permitting them to rotate relative to each other.

This invention comprises a clutch operatively associated with each of the pinion gears to be actuated to control the rotational speed of the pinion gears on the carrier. Control means are provided for selectively actuating the clutches whereby driving torque may be efficiently transferred to the axle which carrier a non-slipping wheel thereon. In a preferred embodiment of this invention, the control means comprises speed responsive means for automatically controlling actuation of the clutches to retard rotation of the pinion gears in response to a rotational speed differential of the drive axles.

BRIEF DESCRIPTION OF THE DRAWINGS

Other objects of this invention will become apparent from the following description and accompanying drawings wherein:

FIG. 2 is an enlarged, sectional view of a portion of a novel clutch and control means employed in the FIG. 1 differential; and FIG. 3 is an enlarged, sectional view taken in the direction of arrows III—III in FIG. 1.

DESCRIPTION OF THE PREFERRED EMBODIMENT

Figure 1:
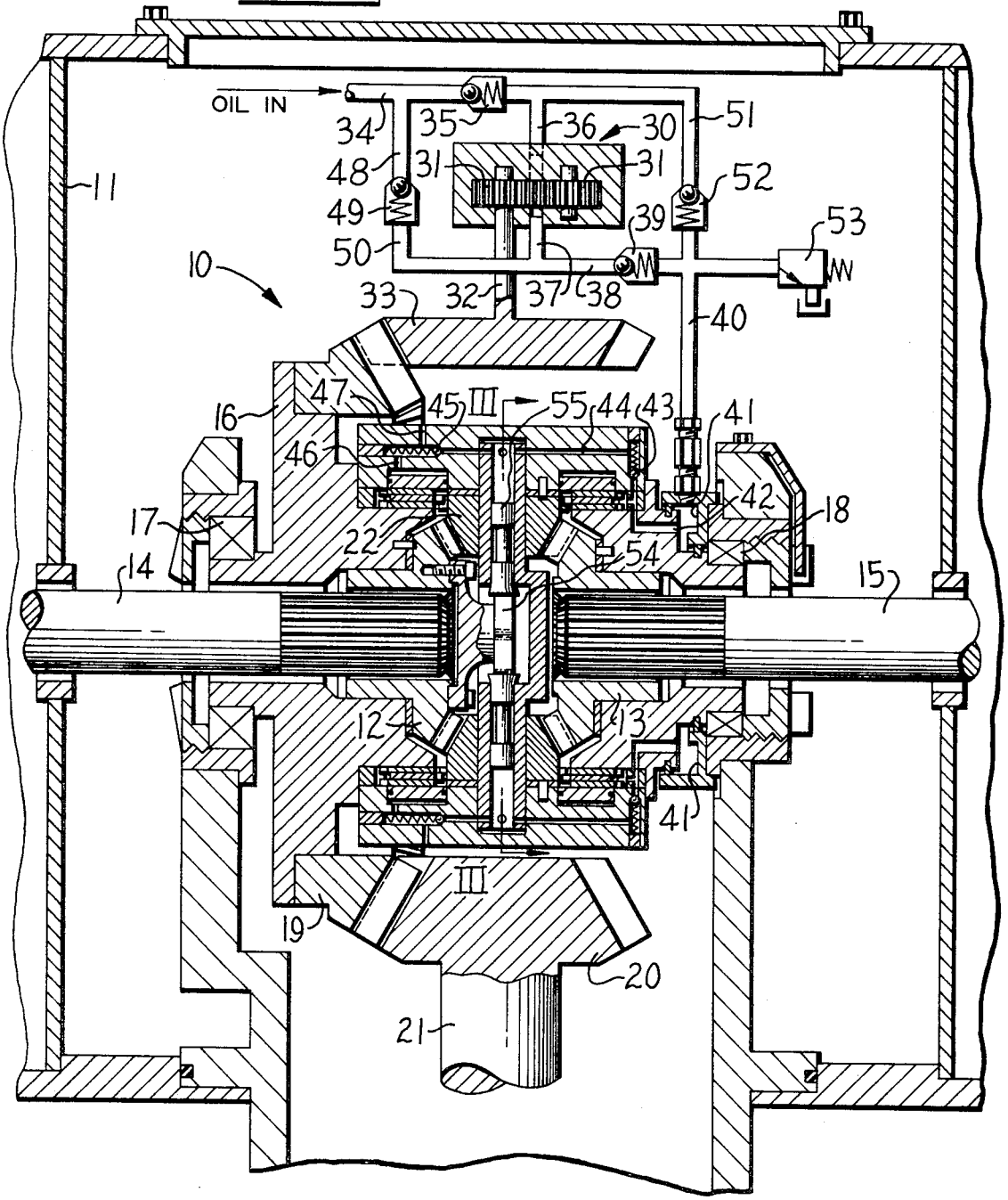
FIG. 1 is a partly schematic, cross-sectional view of a limited slip differential embodying novel aspects of this invention therein.

Referring to FIG. 1, a limited slip differential 10 is mounted in a multi-part housing 11 secured to the frame of a land vehicle (not shown). The differential comprises a pair of juxtaposed differential side or axle gears 12 and 13 splined to drive axles 14 and 15, respectively. Each axle is adapted to drive a ground engaging vehicle wheel (not shown) in a conventional manner. A carrier 16, rotatably mounted on the housing by means of spaced, annular bearings 17 and 18, has a beveled drive gear 19 secured thereto.

The drive gear or drive input means meshes with a drive pinion 20, secured to a drive shaft 21 operatively connected to the vehicle's transmission (not shown) in a conventional manner. During vehicle operation, rotation of the drive shaft will rotate the carrier through gears 20 and 19. The carrier, in turn, imparts rotation to the axle gears and drive axles through four identical differential pinion gear means or spiders 22, each rotatably mounted on the carrier by means of a stub shaft 23.

During normal vehicle operation, with axles 14 and 15 rotating at the same speed, pinions 22 will not rotate on the carrier but will rotate as a unit, about the longitudinal axis of the drive axles, along with the carrier and axle gears. However, when a rotational speed differential of the drive axles occurs, such as when one of the vehicle wheels slips, the pinions will rotate on the carrier to accommodate such differential action. This invention is primarily directed to clutch and control means, operatively associated with the pinions, to selectively control pinion rotation to efficiently transfer driving torque to the non-slipping wheel.

Referring more particularly to FIGS. 2 and 3, each clutch means is shown in the form of a multiple-disc clutch comprising a clutch disc 24 attached to the pinion by a spline connection 25 to prevent relative rotation therebetween, but to permit limited axial movement of the disc. The clutch disc is interleaved with a pair of clutch discs 26 splined to 27 to the carrier in a like manner. If so desired, additional and preferably thinner discs 24 and 26 could be utilized to increase the clutching capacity. An annular piston 28 is reciprocally mounted in an annular chamber 29 to selectively compress the clutch plates together to infinitely control the rotational speed of pinion gear 22 on the carrier.

Referring again to FIG. 1, pressurized fluid, such as hydraulic oil, is communicated to clutch chamber 29 independent of the rotational direction of gear 19 by means of a gear pump 30, at a pressure level of from 30 psi to 50 psi, for example. Gears 31 of the positive displacement pump are driven by means of an input shaft 32 secured to a bevel gear 33 constantly driven by gear 19. When the vehicle is operating in a forward direction, oil supplied to a conduit 34 passes through a check valve 35, a conduit 36, gears 31, conduits 37 and 38, a check value 39, a conduit 40 and into an annular manifold 41.

The pressurized oil then passes through a passage 42, a check value 43, a passage 44, a check valve 45, a port 46 and into clutch chamber 29. A suitably sized vented orifice means 47 is preferably formed in the carrier housing to meter oil out of the clutch chamber, at a predetermined rate, to the differential and axle housing cavity. The orifice is suitably sized (e.g., from 0.0131 in. to 0.047 in.) to provide a controlled pressure level in the clutch chamber for a given amount of differential action and to also bleed-off any air that may be trapped in the system.

When the vehicle is operating in reverse gear, gear 33 and thus gears 31 will rotate in directions opposite to the forward gear operation. Oil is communicated to the clutch chamber via conduit 34, a conduit 48, a check valve 49, a conduit 50, conduit 37, gears 31, conduit 36, a conduit 51, a check valve 52 and conduit 40. A relief valve 53 is suitably integrated into the fluid circuit to maintain the system pressure below a predetermined maximum level (e.g., 50 psi).

Although the four identical clutches could be operated manually, the clutch control means preferably comprises speed responsive means for automatically controlling actuation thereof to retard rotation of pinions 22 in response to a rotational speed differential of wheel drive axles 14 and 15. Such means may comprise an electrically, hydraulically, or mechanically energized system, or combination thereof, designed pursuant to the teachings of this invention.

In a preferred embodiment, the speed responsive means comprises a multi-lobed cam or first means 54 suitably secured to axle gear 12 for rotation therewith. The cam is adapted to engage and reciprocate four identical pistons or second means 55, each of which is reciprocally mounted in a mating bore 56 formed in a respective pinion shaft 23. The bore communicates with clutch chamber 29 via passage 57 and check valve 45 and port 46. The constant oil pressure communicated to chambers 56 by pump 30 will normally urge the pistons to their retracted positions, against the cam.

In operation, with one of the axles rotating faster than the other one, oil introduced into the clutch control means from pump 30 is prevented from escaping by means of check valve 43. The oil displaced from chambers 56, due to reciprocation of pistons 55 therein, flows through check valve 45, port 46 and into the clutch actuating chamber to compress the axially movable clutch discs by means of piston 28. Thus, pinions 22 are clutched to the carrier to retard pinion rotation such that drive torque applied to the differential bevel gears is directed through the clutches and to the non-slipping wheel to continue vehicle movement.

The volume of oil directed to the clutch actuating chambers is primarily determined by the relative speed of rotation occurring as between the carrier assembly and the drive axles. In order to provide a more accurate control of the oil pressure build-up in the clutch actuating chambers and to permit quick bleed-down thereof when differential action ceases, orifices 47 are suitably sized in relation to the volumetric capacity of pump 30 and the displacement of pistons 55 to provide a controlled pressure bleed-off for a given amount of differential action.

As the differential action ceases, such as when the wheels encounter approximately equal tractive conditions, the entire differential assembly and axles rotate as a unit. During such normal condition of operation, cam 54 remains in a relatively stationary position so that pistons 55 are not reciprocated to pressurize the clutch chambers. Under such conditions, the fluid pressure in the clutch actuating chambers is relieved sufficiently to reduce the frictional engagement of the clutch discs so that the differential will function with limited resistance during steering maneuvers of the vehicle to avoid excessive scuffing of the tires.

Orifice 47 is further sized in relation to the capacity of pump 30 to prevent any substantial increase in clutch chamber pressure due to the slight differential action occurring as a result of vehicle steering. For example, in actual practice an orifice diameter of 0.0131 in. provided an outlet flow approximating 25.7 in.$^3$/min. at 750 psi. It should be understood that a speed sensitive or centrifugally actuated valve, for example, could be used in conjunction with orifice 47 to automatically vary the size of the effective bleed orifice in response to the magnitude of differential action.

What is claimed is:

1. A differential comprising
   a pair of juxtaposed axle gears each mounted on a rotatably mounted drive axle,
   a carrier mounted in said differential for rotation relative to said drive axles,
   pinion gear means rotatably mounted on said carrier to mesh with said axle gears for differentially permitting one axle gear to rotate faster than the other axle gear,
   clutch means operatively connectable directly between said carrier and said pinion gear means to be actuated for controlling the rotational speed of said pinion gear means on said carrier, and
   control means for actuating said clutch means.

2. The invention of claim 1 wherein said control means comprises speed responsive means for automatically controlling actuation of said clutch means to retard rotation of said gear means on said carrier in response to a rotational speed differential of said drive axles.

3. The invention of claim 1 wherein said clutch means comprises an axially engaging multiple disc clutch having interleaved discs alternately mounted for limited axial movement on said pinion gear means and on said carrier.

4. The invention of claim 1 wherein said pinion gear means comprises four equally spaced and radially disposed pinions rotatably mounted on said carrier.

5. The invention of claim 2 further comprising rotatably mounted drive input means for rotating said carrier and wherein said control means comprises pump means operatively connected to said drive input means for constantly communicating a pressurized working fluid to said clutch means independent of the direction of rotation of said drive input means.

6. The invention of claim 2 wherein said speed responsive means comprises first means operatively connected to one of said drive axles to be rotated thereby and second means responsive to relative rotation of said first means for actuating said clutch means to retard rotation of said pinion gear means on said carrier in response to a rotational speed differential of said drive axles.

7. The invention of claim 6 wherein said first means comprises a cam.

8. The invention of claim 7 wherein said second means comprises at least one piston reciprocally mounted in a bore formed in said carrier and wherein said control means further comprises means for supplying a working fluid to said bore and to an actuating chamber of said clutch means.

9. The invention of claim 8 wherein said pinion gear means comprises at least one pinion gear rotatably mounted on a shaft attached to said carrier, said bore being formed in said shaft.

10. The invention of claim 9 wherein said pinion gear means comprises four equally spaced and radially disposed pinion gears.

11. The invention of claim 8 wherein said control means further comprises vented orifice means communicating with said actuating chamber for controlling the pressure level therein.

* * * * *